July 20, 1937.  C. V. JOHNSON  2,087,379
SHOCK ABSORBING STRUT
Filed Jan. 21, 1933
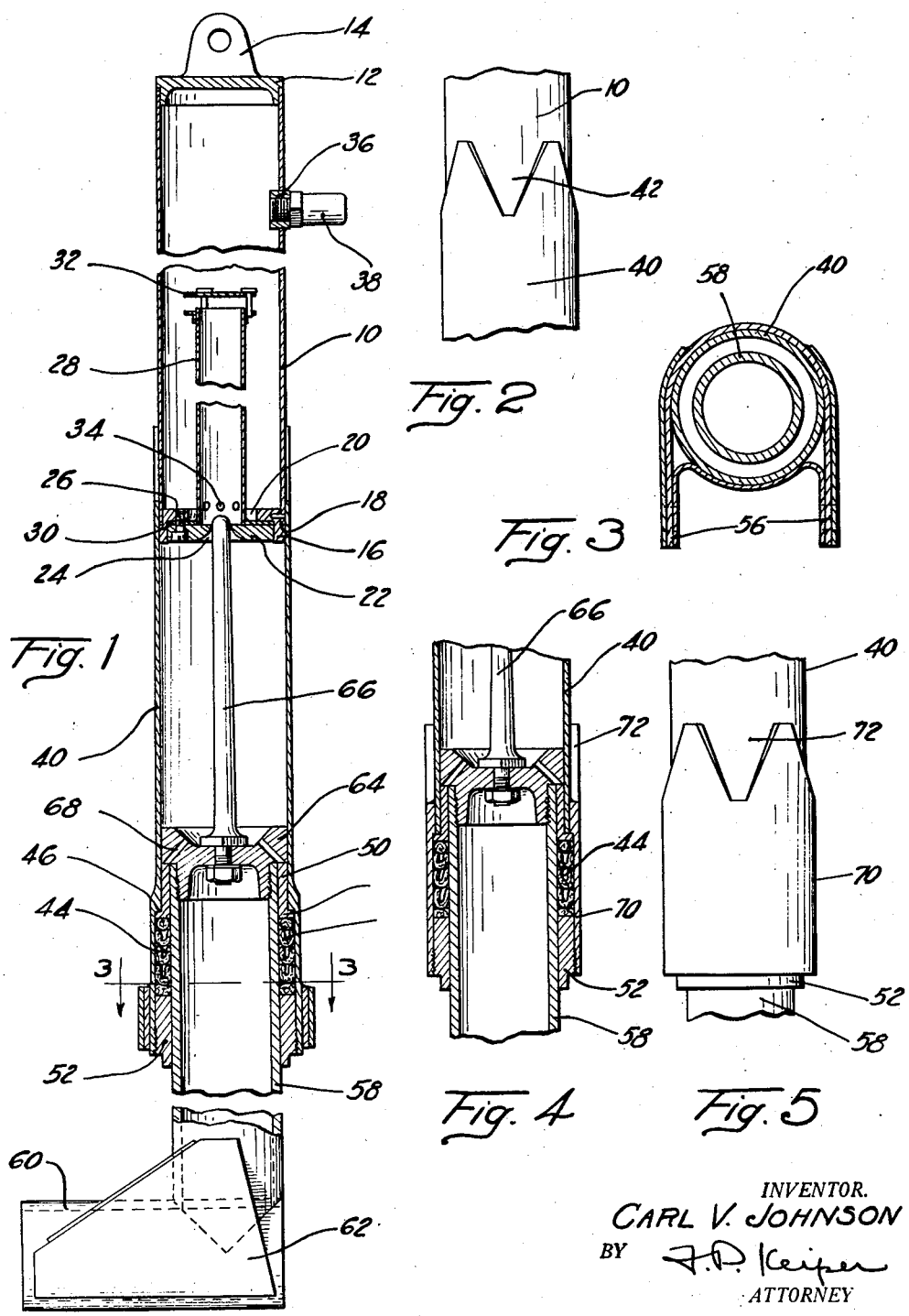
INVENTOR.
CARL V. JOHNSON
BY
ATTORNEY Patented July 20, 1937

2,087,379

UNITED STATES PATENT OFFICE 2,087,379

SHOCK ABSORBING STRUT

Carl V. Johnson, South Bend, Ind., assignor to Bendix Aviation Corporation, South Bend, Ind., a corporation of Delaware Application January 21, 1933, Serial No. 652,915

8 Claims. (Cl. 267—64)

This invention relates to shock absorbers and more particularly to shock absorbing struts for aeroplanes.

It has been found that shock absorbing struts of the hydraulic pneumatic type for aircraft and other types of shock absorbing struts are subjected to considerable bending stress, due to side loads, which has a maximum at or near the end of the packing chamber receiving the packing nut.

It has also been found that in shock absorbing struts for aircraft using diaphragms having metering orifices, the struts occasionally develop weakness where the diaphragm is installed.

The present invention aims to overcome these objections by employing highly desirable structure tending to materially strengthen the struts at both the packing chamber and diaphragm.

An object of the invention is to provide a shock absorbing strut for aeroplanes including telescopic members and means for effectively securing the members together so that the strut may be materially strengthened at the joint.

Another object of the invention is to provide a shock absorbing strut for aeroplanes including telescopic members wherein spaced bearing members are secured to one member on either side of a packing gland to assure a bearing of some length between the members and render them resistant to bending stresses.

Another object is to provide, in a shock absorbing strut including telescopic members wherein the smaller member carries a bearing piston and the larger carries a bearing collar, means for limiting the minimum spacing between said bearing piston and collar to assure strength against bending in all telescopic positions.

A further object of the invention is to provide a shock absorbing strut including a cylinder having a packing chamber, a piston rod in the chamber having a head positioned for reciprocation in the cylinder, and a sleeve member supported adjacent the inner end of the chamber which may be adapted to guide the piston rod and limit its outward movement.

A further object is to provide in a shock absorber comprising a pair of telescopic members, properly spaced bearing means assuring at all times sufficient overlap between the members to prevent bending.

Another object of the invention is to provide a shock absorbing strut for aeroplanes including telescopic cylindrical sections joined together, a diaphragm secured therein at the joint, and a snubbing tube and orifice plate supported on the diaphragm and removable as a single unit.

Another object of the invention is to provide a shock absorbing strut including a cylinder having a packing chamber and means reinforcing the packing chamber.

A further object of the invention is to provide a shock absorbing strut including a cylinder having a packing chamber, a piston rod in the chamber having a head positioned for reciprocation in the cylinder, and a member supported in the chamber and arranged in the cylinder for limiting the movement of the piston head.

A feature of the invention is telescopic cylinder sections, one of which is provided with an irregular profile providing greater area for welding the sections together.

Another feature of the invention is an orifice plate and snubber cylinder removable as a single unit.

Another feature of the invention is a packing chamber and a packing nut threaded therein having an unthreaded part piloted into the chamber.

Another feature of the invention is a packing ring and sleeve arranged in a cylinder to limit movement of a piston positioned for reciprocation in the cylinder.

A further feature of the invention is a cylinder having a packing chamber sleeved thereon and provided with means for imparting rigidity thereto.

Other objects and features of the invention will more fully appear from the following description taken in connection with the drawing, and in which:

Figure 1 is a vertical sectional view of a shock absorbing strut embodying the invention;

Figure 2 is a fragmentary view illustrating the joint between the telescopic sections of the cylinder;

Figure 3 is a cross-sectional view substantially on line 3—3, Figure 1;

Figure 4 is a vertical sectional view, partly broken away, illustrating a modification; and Figure 5 is a side elevation of the modification.

Referring to the drawing and more specific details of the invention, 10 represents a section of a cylinder closed at one end by a cap 12 having formed thereon a clevis 14 for attaching the fuselage of an aeroplane. The other end of the cylinder section has secured thereto a diaphragm 16.

As shown, the diaphragm has a double diameter providing a shoulder 18 for the reception of the end of the cylinder section to which the diaphragm is secured. The diaphragm also has a double diametral bore 20. A case-hardened plate 22 having a metering orifice 24 is fitted in the bore having the larger diameter and is retained against displacement by screws 26.

Positioned concentrically within the cylinder section 10 is a snubbing cylinder 28 having upon one end a circumferential flange 30 clamped between the diaphragm and the case-hardened plate having the metering orifices. By removing the screws 26 the plate having the metering orifices and the snubbing cylinder may be easily removed as one unit. The other end of the snubbing cylinder 28 is provided with a flap valve 32, the purpose of which will hereinafter appear, and a plurality of openings 34 are in the wall of the snubbing cylinder adjacent the diaphragm.

As shown, the cylinder section 10 has suitably secured in the wall thereof, adjacent the cap 12, a short sleeve 36 internally threaded for the reception of a valve 38 through which suitable hydraulic fluid and air or gas may be admitted to the cylinder under pressure.

One end of a section of a cylinder 40 telescopes the end of the cylinder section 10 supporting the diaphragm 16. To lend strength and rigidity to the structure, so that the strut may withstand all stresses and strains imposed thereon due to side loads, also to prevent distortion due to welding the cylinder sections 10 and 40 together, the telescoping end of the cylinder section 40 extends beyond the diaphragm 16 and is notched as indicated at 42, so that in welding the parts together the surface over which the piston moves is not affected and additional welding surface may be obtained by reason of the increased perimeter due to the notches.

The other end of the cylinder section 40 has a packing chamber 44 having a shoulder 46 in its inner end on which is seated a packing retaining ring 48 having a sleeve 50 extending into the cylinder section, which sleeve may be separate from the ring 48 if desired, and the other end of the packing chamber is internally threaded to receive a packing nut 52, suitable packing glands 54 being interposed between the packing retaining ring 50 and the packing nut 52, and suitably secured on the wall of the packing chamber are brackets 56 for suitable bracing, not shown.

A hollow piston rod 58 is positioned for reciprocation with the packing chamber. This rod has secured on one end thereof a sleeve or collar 60 for the reception of the axle of the aeroplane and connecting the sleeve to the piston rod are braces 62 which may be spot welded or otherwise secured to these parts. The other end of the piston rod has suitably secured thereto a head or piston 64 supporting a metering pin 66 for cooperation with the metering orifice 24.

The head 64 may have a close sliding fit in the cylinder section 40 and when the strut is in the extended position the head sets on the sleeve 50 on the packing ring 48. This structure is highly desirable because the strut is often subjected to side loads of considerable magnitude imposed thereon through the brackets 56 on the outer wall of the packing chamber, hence the piston tube is subjected to considerable bending stress which is maximum at or near the outer end of the packing chamber. Accordingly, by increasing the space between the head of the piston and the packing nut 52, by employing piloting the sleeve 50, the bearing conditions for transmitting side loads are greatly improved. If desired, the sleeve 50 may have a close sliding fit with the piston tube 58, whereby additional rigidity may be gained or the close fit of piston head 64 with the cylinder 40 and the necessary finished internal cylinder surface may be eliminated.

The piston head 64 has a series of ducts 68 drilled diagonally through the head to provide for free access of fluid from the cylinder section into the annular chamber around the piston rod created as the piston moves along the cylinder on the compression stroke, thus keeping the packing glands under pressure at all times.

A modification of the invention is illustrated in Figures 4 and 5. In this modification the packing chamber 44 is formed by a short tubular section 70 sleeved on the cylinder section 40. As shown, the short tubular section has a notched or irregular profile 72 on its telescopic end, so that greater surface may be had for welding the short tubular section to the cylinder section. This structure materially strengthens the strut at the packing chamber where the maximum strains are imposed due to side load.

Assuming that the strut is filled with suitable hydraulic liquid and air or gas under pressure, it will under impact of landing cause the hydraulic liquid to be forced through the metering orifice in the diaphragm, past the metering pin, into the upper cylinder section where the air or gas will be compressed by the rise of the liquid, and this combined resistance offered by the compression of the air or gas and the flow of liquid produces the work curve desired.

On the compression stroke fluid flows through the ducts 68 in the piston head into the annular chamber formed back of the piston head and maintains the packing glands under pressure. The liquid passes freely through the flap valve on the top of the inner chamber into which the metering pin extends, and on the return stroke the flap valve closes due to the pressure of the compressed air or gas forcing the liquid to return through the smaller opening in the base of the snubber chamber, thus snubbing the rebound that would otherwise result.

Although this invention has been described in connection with certain specific embodiments, the principles involved are susceptible of numerous other applications that would readily occur to persons skilled in the art. The invention is, therefore, to be limited only as indicated by the scope of the appended claims.

Having thus described the various features of the invention, what I claim as new and desire to secure by Letters Patent is:

1. A shock absorbing strut comprising telescopic cylinder sections overlapped and secured together, a diaphragm secured therein and resting against the peripheral end of the inner cylinder, and the walls of the outer cylinder section, said outer cylinder section extending past the diaphragm and provided with securing notches through the wall thereof.

2. A shock absorbing strut comprising telescopic sections lapped and joined together, a diaphragm secured therein at the joint and seated on the end of the inner cylinder, and a removable orifice plate supported on the diaphragm, said diaphragm resting against the inner wall of the outer telescopic section.

3. A shock absorbing strut comprising telescopic cylinder sections joined together, a diaphragm secured therein at the joint, an orifice plate supported by the diaphragm, and a snubber cylinder clamped between the diaphragm and the orifice plate.

4. A shock absorbing strut comprising telescopic cylinder sections secured together, an apertured diaphragm secured therein at the joint, a plate supported by the diaphragm having an orifice registering with the aperture in the diaphragm, and a snubber cylinder arranged concentrically in one of the cylinder sections and provided with a flange clamped between the orifice plate and the diaphragm.

5. A shock absorbing strut comprising telescopic cylinder sections overlapped and secured together, an apertured diaphragm secured therein and resting against the peripheral end of the inner cylinder, a piston reciprocating in the outer cylinder and adapted to move toward said diaphragm and said peripheral end, said cylinders being secured together at a point beyond the portion of the cylinder sections subjected to piston travel.

6. In a shock absorbing strut, a pair of telescopic cylinders secured together in overlapping arrangement, and a diaphragm in the outer cylinder and secured against endwise movement by abutment against the smaller cylinder and sidewise movement by direct engagement with the side walls of the outer cylinder.

7. In a shock absorbing strut, an inner cylindrical member, and outer cylindrical member having an irregular profiled end telescoped over said inner cylinder and welded thereto, a piston in the outer cylinder and a diaphragm within the outer cylinder and resting against the end of the inner cylinder whereby the cylinder portion not exposed to welding temperatures is employed for reciprocation of the piston.

8. A shock absorbing strut comprising telescopic cylinders joined together, a diaphragm secured at the joint and bearing against the end of the inner cylinder and the side walls of the outer cylinder, said diaphragm including an orifice plate arranged on a shouldered seat formed in similar relation to the shoulder formed by the end of the inner telescopic cylinder.

CARL V. JOHNSON.